United States Patent

Woydt et al.

[11] Patent Number: 6,017,592
[45] Date of Patent: Jan. 25, 2000

[54] PROCESS FOR THE MANUFACTURE OF A TRIBO-SYSTEM

[75] Inventors: Mathias Woydt, Berlin; Michael Dogigli; Karl Wildenrotter, both of Karlsfeld, all of Germany

[73] Assignee: MAN Technologie Aktiengesellschaft, Augsburg, Germany

[21] Appl. No.: 09/151,337

[22] Filed: Sep. 11, 1998

Related U.S. Application Data

[62] Division of application No. 08/986,778, Dec. 8, 1997.

[30] Foreign Application Priority Data

Dec. 9, 1996 [DE] Germany .......................... 196 51 094

[51] Int. Cl.[7] .............................. C23C 4/10; C23C 16/40
[52] U.S. Cl. .................... 427/454; 427/453; 427/255.12; 427/255.19; 427/248.1; 508/108; 384/907.1
[58] Field of Search ....................................... 427/453, 454, 427/255.12, 255.19, 248.1; 508/108; 384/907.1

[56] References Cited

U.S. PATENT DOCUMENTS

| 5,741,762 | 4/1998 | Kahlman | 508/108 |
| 5,752,773 | 5/1998 | Rosado et al. | 384/527 |

*Primary Examiner*—Katherine A. Bareford
*Attorney, Agent, or Firm*—McAulay Nissen Goldberg Kiel & Hand, LLP

[57] ABSTRACT

A tribo-system comprises a first structural component part and a second structural component part which are in dry frictional contact with one another, each through a surface layer. For this purpose, the surface layer of the first structural component part is based on oxides or mixed oxides in monoclinic, triclinic or tetragonal crystal structure formed from $MeO_6$ octahedrons with planar oxygen defects.

6 Claims, 2 Drawing Sheets

PROCESS FOR THE MANUFACTURE OF A TRIBO-SYSTEM

This application is a division of Application Ser. No. 08/986,778, filed Dec. 8, 1997.

BACKGROUND OF THE INVENTION a) Field of the Invention

The invention is directed to a tribo-system with a first structural component part and a second structural component part, wherein these structural component parts are in dry frictional contact with one another, each through a surface layer, and to a process for the manufacture of a tribo-system of this type.

b) Description of the Related Art

The invention relates in particular to the material construction of tribo-systems (friction systems) in the aviation and aerospace industry that operate without liquid lubricants or lubricating grease and whose structural component parts are loaded by temperatures of up to 2000° C., for example, in reusable launchers, hypersonic airborne vehicles and hypersonic aircraft, reentry airborne vehicles and in high-temperature components or components in the hot part of propulsion units such as, e.g., aircraft engines.

All known liquid lubricants are thermally unstable in air above a continuous sump temperature of 200° C. and at temporary temperature peaks above 350° C. and pass into the gaseous phase at temperatures above 400° C., so that they are scarcely usable except as disposable lubricants, although this is to be avoided for ecological-toxicological reasons.

Efforts continue to be made to provide friction locations with lubricants through a gaseous surrounding medium, wherein the lubricants form lubricating connections with the friction surfaces only upon frictional contact by decomposition or reaction with these friction surfaces. However, substances such as tricresyl phosphate, phthalocyanine or aryl phosphate which are mixed in with the gas require other operating means with regulating and controlling technology on the one hand and, on the other hand, are also objectionable in ecological and toxicological respects to the same extent as the previously known substances.

In the case of high-temperature applications in tribo-systems above 400° C., there has been no shortage of attempts in the past to ensure reliable tribological operation over the long term, for example, by arranging solid lubricants in layers and material matrices or by coating directly with solid lubricants. These attempts did not prove successful in practice, however, because all of the known intrinsic solid lubricants lose their favorable tribological properties as the surrounding temperature increases and/or as the oxygen partial pressure increases. Further, solid lubricants which are arranged in material matrices are considerably weakened with respect to their mechanical characteristics and coating capability.

Therefore, tribo-systems used in the aviation and aerospace industry which are subjected to structural component temperatures of 700° C. to 2000° C. through the heat conduction of friction heat and process heat in the friction locations and which therefore chiefly run dry are generally either discarded as unrealizable or are installed in cooler regions following suitable heat sinks and with appropriate thermal insulation. In the latter case, the resulting constructions are bulky and accordingly take up excessive space and are also heavy and therefore uneconomical in terms of weight. Nevertheless, such embodiment forms can usually only be used once for a flight mission and are serviced and repaired after every use.

The tribological behavior of the materials chiefly used at the present time for the material construction of tribo-systems during dry running limits the life of the products and systems outfitted with the tribo-system because the extent of wear or wear coefficient of the pairing of materials is too high at $>10^{-5}$ mm$^3$/Nm. Consequently, determined constructions with long wear distance and large allowed tolerances must be used so that the friction locations do not undergo adhesive failure, i.e., so that they do not fuse (or "seize"). Such measures against adhesive failure always increase the wear coefficient with increasing temperature or, in other words, increase wear and allow only a short useful life. Other failure criteria determining the life of these products are material degradation, especially due to oxidation, phase transition, and creep.

Bearing materials of $Cr_3C_2$-$CaF_2$ which have wear coefficients greater than $5 \times 10^{-5}$ mm$^3$/Nm at 700° C. have been suggested, for example, for the friction locations operating at approximately 700° C. in the HERMES space shuttle. $CaF_2$, as extrinsic solid lubricant, softens at approximately 1000° C. and also separates due to the high wear coefficient when applied as bearing material at temperatures up to 2000° C.

OBJECT AND SUMMARY OF THE INVENTION

The primary object of the invention is to improve a tribo-system with a first structural component part and a second structural component part which are in dry frictional contact with one another, each through a surface layer, such that it can operate reliably without difficulty also at high temperatures such as those occurring in propulsion units.

According to the invention, this object is met in a tribo-system of the type mentioned above in that the surface layer of the first structural component part is made from a material based on oxides or mixed oxides in monoclinic, triclinic or tetragonal crystal structure formed of (metal)$O_6$ octahedrons with planar oxygen defects.

A high-temperature lubrication is achieved by means of the invention in that at least one surface of the closed tribo-systems which operate without liquid lubricant and/or lubricating grease is provided, as a sliding or rolling contact, with a novel coating which, due to its material prerequisites and characteristics, is structurally capable of forming wear-reducing or wear-resistant substances on its own free surfaces through static oxidation and/or through the oxidation promoted during tribological loading (tribo-oxidation).

It has been found, according to the invention, that the above-mentioned wear-reducing substances have a low shear strength with shear stresses of less than 100 MPa and are therefore able, during dry running, to absorb the friction force transmitted between the surfaces moving relative to one another by means of shearing action within the layers formed by these substances which in the case of liquid-lubricated friction points would otherwise normally be carried out in the liquid lubricating film. The mechanism of "tribological" shear in these substances accordingly forms a kind of substitute function capable of functioning up to temperatures of 2000° C. in place of the shearing action of a liquid film. Accordingly, a traditional problem relating to high temperatures, especially in the field of aviation and aerospace, is solved for the first time in a simple manner by a material application in situ.

Thus, according to the invention, specific materials which form soft reaction layers on their surfaces and which are at least mostly stable in oxidizing atmospheres and/or in a vacuum are used so that the tribological shear stress in dry running is shifted from the base material in the near-surface regions to the oxides or mixed oxides in monoclinic, triclinic or tetragonal crystal structure formed of i-(metal)$O_6$ octahedrons with planar oxygen defects, where shearing is effected as it is in a liquid lubricant film. Substances with a Vickers hardness of less than 8 GPa at room temperature are considered soft reaction layers.

The oxides or mixed oxides, according to the invention, in monoclinic, triclinic or tetragonal crystal structure formed of $MeO_6$ octahedrons with planar oxygen defects are structurally exactly describable phases with a defined crystallographic arrangement of atoms of determined substoichiometric oxides. Titanium oxides and vanadium oxides, for example, in accordance with the formula $(metal)_nO_{2n-1}$, where n>4, and tungsten oxides and molybdenum oxides, e.g., according to the formula $(metal)_nO_{3n-1}$, where n>6, are formed as embodiment examples. These metal oxides which are constructed crystallographically as $(metal)O_6$-octahedrons form, as a characterizing property, on the basis of planar oxygen defects, crystallographically oriented shear planes on which lattice slippage occurs already at low shear stresses starting at approximately 10 MPa.

Substances, for example, with a Vickers hardness of less than 8 GPa at room temperature are regarded as soft reaction layers or oxides of the surface coat according to the invention. Already at a temperature of 1000° C., the hardness of these oxides decreases to values of less than 2 GPa and tends to drop further at temperatures up to 1600° C., which benefits the shearing mechanism through plastic flow, which will be discussed in particular hereinafter.

The most striking advantage of these soft oxides over the previous solutions according to the prior art consists in that they are chemically stable in air so that their beneficial tribological characteristics are also not lost as the temperature increases, and their formation by the operating conditions of the tribo-systems in question, e.g., in flying equipment in the aviation and aerospace industry, i.e., at high temperatures of up to 2000° C. and, sometimes, in surrounding atmospheres with reduced oxygen partial pressure, is even benefitted. The invention is also further advantageous in that the friction location need no longer be shifted to cooler regions and the friction locations can be operated as "hot friction locations" within a wide temperature range, which has an advantageous result with respect to weight and leads to a gain in construction volume and is particularly advantageous in aviation and aerospace. The wear coefficients of materials forming the structures used according to the invention are less than $10^{-5}$ mm$^3$/Nm at temperatures above 700° C. and enable the material construction of wear-resistant closed tribo-systems.

In addition to the mechanism of crystal slippage, the mechanism of plastic flow, which will be discussed more fully hereinafter, has surprisingly also proven advantageous for the above-mentioned uses with respect to protection against wear, especially when the shear stress of the soft reaction layer is less than 100 MPa. Plastic flow occurs especially at temperatures above 1000° C. The substrate material on whose surface a soft oxide with low shear stress is formed by static oxidation and/or tribo-oxidation is preferably SiC on which a SiO, is formed, where 1<x<2.

The invention has the further advantage that the novel coating also has, in addition to the wear-reducing effect, a friction-reducing effect which benefits the operation of the tribo-system.

A further advantage was found in that the operating conditions in hot tribo-systems at high temperatures and low oxygen partial pressures benefit the stability of the surface layer according to the invention.

As a result of the invention, determined crystallographic factors of the oxides or mixed oxides used in the surface layer are recognized for the first time as suitable for solving the problems relating to friction and wear in hot tribo-systems such as a hot joint, for example.

The entire first structural component part, for example, can, without restrictions, be built directly from materials with or made from the said substances of the surface layer according to the invention. However, in accordance with the preferred embodiments, the first and/or second structural component part are/is at least substantially made from C-SiC.

Preferred materials contained individually or in combination at least in the surface layer of one structural component part or at least substantially forming this surface layer are $TiO_{2-x}$, $Ti_5O_9$, gamma-$Ti_3O_5$, $Ti_9O_{17}$, $Ti_{10}O_{19}$, $Mo_8O_{23}$, high-$V_3O_5$, $WO_3$, $W_{20}O_{58}$, β-$NiMoO_4$, $Ti_{n-2}Cr_2O_{2n-1}$, $V_{0985}Al_{0015}O_2$, tetragonal tungsten oxide bronzes and/or vanadium oxide bronzes ($M_xV_2O_5$).

Generally, surface layers according to the invention, especially surface layers of the first structural component part, with oxides or mixed oxides in monoclinic, triclinic or tetragonal crystal structure formed of $MeO_6$ octahedrons with planar oxygen defects are applied already as coating material, for example, by thermal spraying or by the CVD or PVD process.

However, it is also possible that the surfaces determining the tribosystem according to the mechanism of tribo-oxidation can be formed during operation directly on structural component parts which, e.g., in addition, are made entirely of tribologically advantageous oxidic, nitridic, or carbidic substances or mixtures or of substances or mixtures belonging to this group of materials, preferably in the form of engineering ceramics with other oxides or non-oxides. Surface layers, according to the invention, can accordingly also be formed during tribological loading by reaction with the surrounding atmosphere, e.g., as in the case of SiC.

It can further be provided in an advantageous manner that the surface layer of the first structural component part is a wear-resistant layer.

In accordance with another advantageous further development of the invention, extrinsic solid lubricants or mixtures can also be used, in addition, as materials or coatings for making, coating, or infiltrating the structural component parts in question.

The substrate materials on whose surface oxides or mixed oxides in monoclinic, triclinic or tetragonal crystal structure formed from $MeO_6$ octahedrons with planar oxygen defects are formed as reaction layers by static oxidation and/or tribo-oxidation can be, for example, HfC, TiC, TiN, Ti (C,N), (Ti, Mo) (C,N), SiC, WC, $Cr_2C_3$, etc., especially as thin, passive films. In addition, these substrates are also advantageous because they are relatively hard, since their Vickers hardness is greater than 10 or 15 GPa at room temperature. Great hardness results in a small micro-contact surface (true contact surface) of the parts in frictional contact with one another with the result that the shearing force in connection with the low shear stress during friction is particularly low. The tribological action of the surface layer, according to the invention, of the first structural component part with oxides or mixed oxides in monoclinic, triclinic or tetragonal crystal structure formed from $MeO_6$ octahedrons with planar oxygen defects is accordingly further enhanced. Under the operating conditions aimed for in the hot tribo-system, the structures used according to the invention, for example, can be formed preferably already by means of the static oxidation of the hard substrate material or, at the latest, by friction-induced oxidation with the oxygen-containing surrounding atmosphere. The substrate materials mentioned herein can fundamentally also determine the surface layer of the second structural component part or can be contained therein.

The surface layer of the second structural component part is preferably based on SiC or HfC. This is advantageous because there is often a SiC layer, for example, on the corresponding structural component part as an antioxidation layer. The same advantage is provided when an intermediate layer, preferably based on SiC or HfC, is arranged between the surface layer of the first structural component part and the first structural component part.

A closed tribo-system is always formed of two solid bodies which contact by their surfaces at determined contact locations; this is what is meant by a tribological pairing of materials. The materials indicated as substrates and reaction layers are ultimately ceramic materials which can sinter without pressure at temperatures above 1100° C. Since the two surfaces of the parts in frictional contact with one another make contact, a fusing or sintering together must be expected at operating temperatures above 1100° C. (when the increase in temperature caused by friction is taken into account, a temperature of approximately 800° C. can already be assumed). This can be prevented through the use of the invention when the materials of the tribo-pairing are not soluble in each other metallurgically and/or the sintering temperatures lie above the operating temperature.

The surface layer of the first structural component part can also contain filler materials such as $TiO_2$ and/or oxides different than the oxides or mixed oxides in monoclinic, triclinic or tetragonal crystal structure formed from $MeO_6$ octahedrons with planar oxygen defects. These other oxides can preferably contain titanium oxides, vanadium oxides, tungsten oxides and/or molybdenum oxides such as, e.g., $TiO_{2-x}$, $Ti_5O_9$, gamma-$Ti_3O_5$, $Ti_9O_{17}$, $Ti_{10}O_{19}$, $Mo_8O_{23}$, high-$V_3O_5$, $WO_3$, $W_{20}O_{58}$, $\beta$-$NiMoO_4$, $Ti_{n-2}Cr_2O_{2n-1}$, $V_{0.985}Al_{0.015}O_2$ tetragonal tungsten oxide bronzes and/or vanadium oxide bronzes ($M_xV_2O_5$) or a combination thereof. However, these oxides differ, especially in phase or structure, from the oxides or mixed oxides in monoclinic, triclinic or tetragonal crystal structure formed of $MeO_6$ octahedrons with planar oxygen defects which, according to the invention, are compulsorily contained in the surface layer of the first structural component part or form this surface layer and which possibly have the same composition.

Another advantageous further development of the invention consists in that the oxides or mixed oxides of the surface layer of the first structural component part in monoclinic, triclinic or tetragonal crystal structure formed of $MeO_6$ octahedrons with planar oxygen defects have a shear plane structure.

Further, additives for improving adhesion can preferably be contained in the surface layer of the first structural component part and/or in the surface layer of the second structural component part.

The surface layer of the first structural component part advantageously has a thickness of at least 1 $\mu$m.

According to another advantageous construction of the invention, the oxides or mixed oxides of the surface layer of the first structural component part in monoclinic, triclinic or tetragonal crystal structure formed of $MeO_6$ octahedrons with planar oxygen defects are stable up to temperatures above 400° C., especially up to temperatures above 800° C., preferably up to temperatures above 1200° C., and especially preferably up to 1600° C., and/or remain in the solid state in the indicated temperature ranges. The thermal stability range of the structure of the surface layer according to the invention extends from approximately −100° C. to approximately 1600° C. and even beyond this with some materials.

The invention also comprises a process for manufacturing tribo-systems, in which regard several process steps and aspects of the process have already been indicated in the preceding. Accordingly, it is provided by way of example and in an advantageous manner that the surface layer of the first structural component part is applied to the first structural component part or, if required, to the intermediate layer, by CVD, PVD or thermal spraying. Further, as an alternative to this or in combination therewith, the first and/or the second structural component part can be produced by a gradient CVI process. A further advantageous configuration of the process is provided in that the surface layer of the second structural component part is preoxidized before being arranged in the tribo-system.

The invention is described more fully hereinafter by way of example with reference to embodiment examples in the drawing.

DESCRIPTION OF THE PREFERRED EMBODIMENTS

Figure 1:
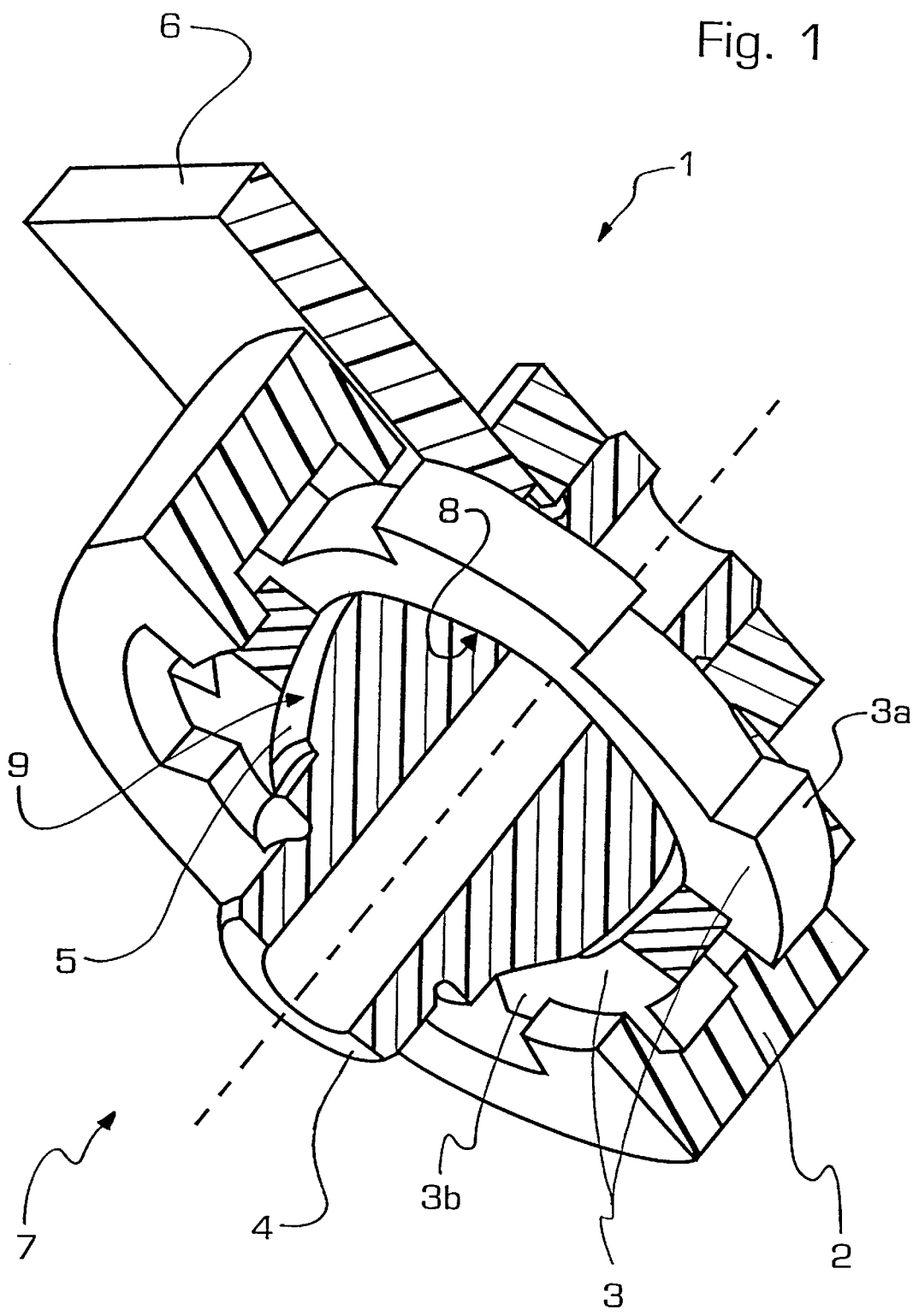
FIG. 1 shows a basic sectional view of a bearing with a tribo-system.
Figure 2:
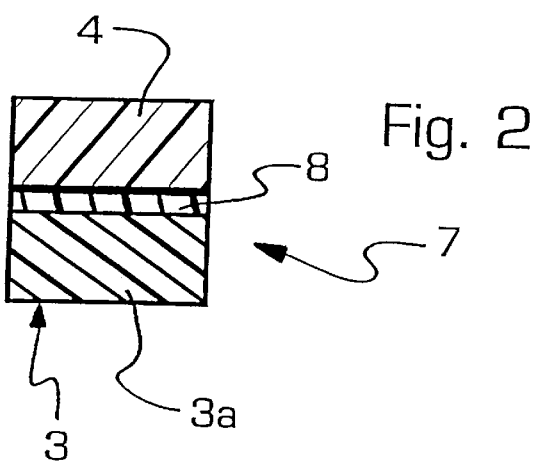
FIG. 2 shows a schematic enlarged sectional view of a first embodiment form of a tribo-system according to the invention with two structural component parts in frictional contact.

The bearing 1 shown in FIG. 1 comprises an articulated connection and contains a bearing cage 2 which is constructed in the manner of a quarter-turn fastener for the installation of a two-part bearing shell 3, wherein the bearing shell 3 is formed of correspondingly shaped bearing shell halves 3a and 3b. The two-part bearing shell 3 facilitates mounting on a shaft 4 with a spherically curved bearing surface 5 which makes it possible to absorb radial and axial loads. Means for introducing force 6 are rigidly connected with the bearing cage 2. All of the parts and elements of the bearing I that are mentioned above are produced in the shown embodiment example from C-SiC material by a gradient CVI process.

The bearing shell 3 and the portion of the bearing shaft 4 containing the spherically curved bearing surface 5 form a tribo-system 7. FIGS. 2 to 6 show enlarged schematic sectional views through different embodiment forms of the bearing shell 3 and bearing shaft 4 in a region in which the surfaces of these components are in dry frictional contact with one another, i.e., no lubrication takes place.

As can be seen from FIGS. 2 to 6, the bearing shell 3 or each of the bearing halves 3a and 3b as first structural component part of the tribo-system has a surface layer 8 which contains oxides or mixed oxides in monoclinic, triclinic or tetragonal crystal structure formed of $MeO_6$ octahedrons with planar oxygen defects as a wear-resistant layer for the substrate material of the bearing shell 3.

In the present case, the surface layer 8 of the first structural component part of the tribo-system forming the bearing shell 3 contains oxides in triclinic crystal structure formed of $MeO_6$ octahedrons with planar oxygen defects such as, e.g., $TiO_{2-x}$, $Ti_5O_9$, gamma-$Ti_3O_5$, $Ti_9O_{17}$, or $Ti_{10}O_{19}$. But other oxides or mixed oxides such as, e.g., $Mo_8O_{23}$, high-$V_3O_5$, $WO_3$, $W_{20}O_{58}$, β-$NiMoO_4$, $Ti_{n-2}Cr_2O_{2n-1}$, $V_{0.985}Al_{0.015}O_2$, tetragonal tungsten oxide bronzes and/or vanadium oxide bronzes ($M_xV_2O_5$) are also suitable and can be contained in the surface layer 8.

Figure 3:
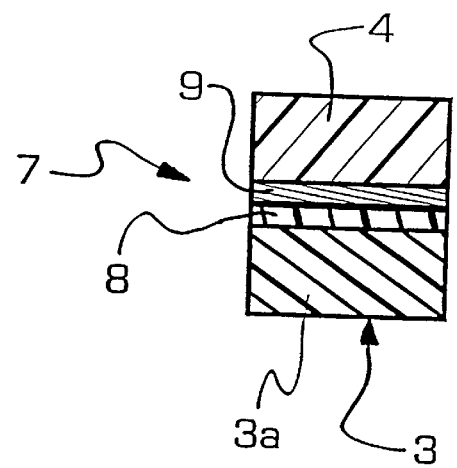
FIG. 3 shows a schematic enlarged sectional view of a second embodiment form of a tribo-system according to the invention with two structural component parts in frictional contact.
Figure 4:
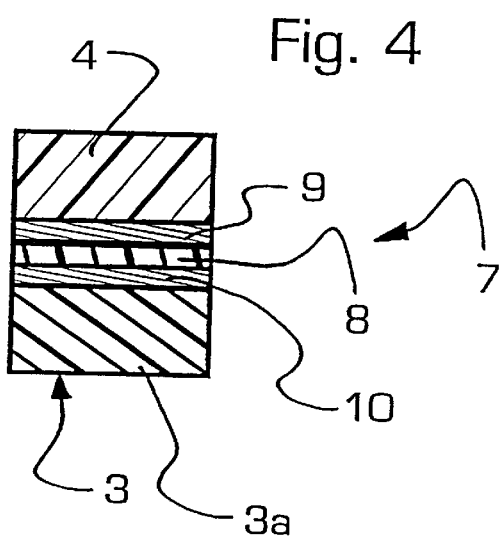
FIG. 4 shows a schematic enlarged sectional view of a third embodiment form of a tribo-system according to the invention with two structural component parts in frictional contact.

In the embodiment forms of the tribo-system shown in FIGS. 3 and 4, the bearing shaft 4 forming the second structural component part of the tribo-system also has a surface layer 9 based on SiC. Another or additional material for this surface layer 9 could also be, for example, HfC.

As can be seen from FIG. 4 in the embodiment of the tribo-system shown therein, an intermediate layer 10 is arranged between the surface layer 8 of the first structural component part 3 and the first structural component part 3 itself, this intermediate layer 10 is based on SiC like the surface layer 9 of the second structural component part 4. Other materials are also suitable for this purpose, wherein only HfC is mentioned by way of example.

In the embodiment presently under discussion, a layer applied by chemical vapor deposition for protection against oxidation of the CVI/C-SiC structure material is used as SiC. This SiC layer already simultaneously forms the friction layer in the second structural component part and, in the first structural component part 3, forms the substrate surface for the tribo-coating of its surface.

SiC or HfC is particularly well-suited as a substrate for these tribo-layers because the high degree of hardness leads to a small true contact surface (micro-contact surface) resulting in only a small shearing force or friction force The hardness of SiC is still approximately 5–6 GPa at 1600° C.

It has been found that the tribo-oxidation, for example, in SiC, can serve as a lubrication and wear-resistance mechanism which acts at room temperature in dry air already starting from 50 Pa oxygen partial pressure and is promoted by increasing surrounding temperature In this respect, it is assumed that SiC partially decomposes into silicone and graphite, e.g., at 1600° C., at the surface of the structural component part. For use in a hot joint or generally in a tribo-system, this means that effective and favorably acting lubrication and wear-resistance mechanisms are accordingly available, for example, with tribo-oxidation and the possible graphite formation on the SiC surface for all conceivable operating conditions such as low and elevated temperatures and low oxygen partial pressures and standard atmosphere.

When the SiC in the friction location is preoxidized before assembly, e.g., in the case of a propulsion unit on the ground, it is expected that the wear reserve of the soft reaction layer will be sufficient, with respect to tribology, for one mission starting in a low vacuum.

Figure 5:
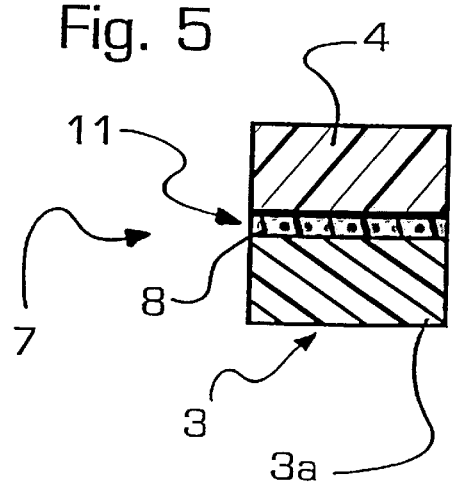
FIG. 5 shows a schematic enlarged sectional view of a fourth embodiment form of a tribo-system according to the invention with two structural component parts in frictional contact.

Another design possibility for the tribo-system which is shown in FIG. 5 consists in that the surface layer 8 of the first structural component part 3 contains fillers 11 such as $TiO_2$ and/or oxides different from the oxides or mixed oxides in monoclinic, triclinic or tetragonal crystal structure formed of $MeO_6$ octahedrons with planar oxygen defects. Such oxides can be titanium oxides, vanadium oxides, tungsten oxides and/or molybdenum oxides. The following materials, which are used in this layer in any case, are especially suitable: $TiO_{2-x}$, $Ti_5O_9$, gamma-$Ti_3O_5$, $Ti_9O_{17}$ or $Ti_{10}O_{19}$, $Mo_8O_{23}$, high-$V_3O_5$, $WO_3$, $W_{20}O_{58}$, β-$NiMoO_4$, $Ti_{n-2}Cr_2O_{2n-1}$, $V_{0.985}Al_{0.015}O_2$, tetragonal tungsten oxide bronzes and/or vanadium oxide bronzes ($M_xV_2O_5$) or combinations thereof.

Figure 6:
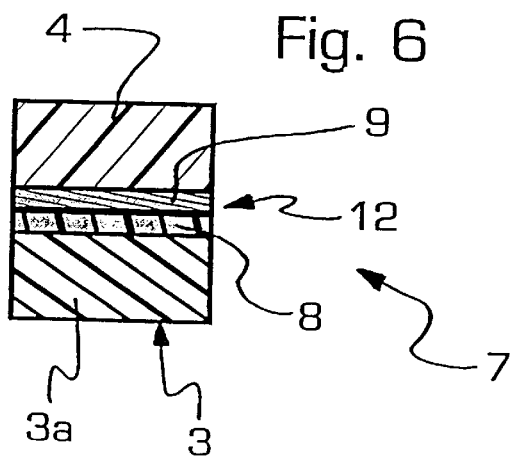
FIG. 6 shows a schematic enlarged sectional view of a fifth embodiment form of a tribo-system according to the invention with two structural component parts in frictional contact.

In order to improve adhesion, the surface layers 8 and 9 of the two structural component parts 3 and 4 of the variant of the tribo-system shown in FIG. 6 contain additives 12. However, it is also possible, especially depending upon the intended use of the tribo-system and the conditions pertaining to this use as well as on the materials and combinations of material used, to use suitable additives in only one of the two surface layers 8 or 9, or different additives in each.

The surface layers 8 and 9 of the two structural component parts 3, 4 contain materials which are at least substantially insoluble metallurgically in one another. Alternatively, it is possible that each or both of the surface layers is or are made entirely from such materials. These materials are so selected that their sintering temperatures are at least substantially above a maximum operating temperature of the bearing 1.

In technical respects relating to manufacture, the surface layer 8 of the first structural component part 3 is applied to the first structural component part 3 or, if required to the intermediate layer 10, by means of CVD, PVD or thermal spraying. The surface layer 8 has a thickness of 1 μm or more. The oxides or mixed oxides of the surface layer 8 in monoclinic, triclinic or tetragonal crystal structure formed of $MeO_6$ octahedrons with planar oxygen defects have a shear plane structure. The shear stress of the surface layer 8 of the first structural component part 3 is less than 100 MPa in the embodiment forms shown in FIGS. 2 to 6.

When using suitable materials, the oxides or mixed oxides of the surface layer 8 of the bearing halves 3a, 3b are stable up to temperatures greater then 1600° C., e.g., 2000° C., and remain in the solid state. However, depending upon the required use specifications, surface layers can also be formed which are stable and/or remain in the solid state, e.g., up to 400° C. or up to 800° C. or up to 1200° C.

However, the surface layer 9 of the second structural component part 4 can also be preoxidized before the second structural component part, i.e., the bearing shaft 4, is mounted in the tribo-system.

In individual further constructions, the oxides or mixed oxides can be used in the following ways:

a) Coating with materials forming oxides or mixed oxides in monoclinic, triclinic or tetragonal crystal structure formed of $MeO_6$ octahedrons with planar oxygen defects:

A material which is resistant to high temperatures, e.g., carbon-fiber-reinforced CVI-SiC which is coated with a SiC layer for protection against oxidation at the friction location, serves as a substrate at the friction location. A further tribo-layer comprising, e.g., TiC or other suitable substrate materials, is applied to this SiC layer at the friction location by means of thermal spraying, CVD or PVD. The tribologically active reaction layers are formed either by the action of the tribological loading as a chemical reaction at the surface of the material between the material and the surrounding medium or already by means of static oxidation. In sliding bearings, only the friction surfaces of the inner bearing shell and those of the bearing pin are coated, whereas, in a roller bearing construction, at least (or, as the case may be, only) the running surfaces of a corresponding inner and outer ring are coated.

b) Coating with materials forming soft oxides

A material which is resistant to high temperatures, e.g., carbon-fiber-reinforced CVI-SiC which is coated with a SiC layer for protection against oxidation at the friction location, serves as a substrate. The soft, tribologically acting reaction layer is formed on this SiC layer as protection against wear either as a result of the tribological loading as a chemical reaction of the material surface with the surrounding medium or already by static oxidation. Accordingly, for the first time, the SiOx layer forming on the SiC, apart from its action as an antioxidation layer, is also provided as a tribo-layer suitable for high-temperature loading. In a sliding bearing construction, only the friction surfaces of the inner bearing shell and/or of the bearing pin need be coated.

c) Solid materials

The coatings can be replaced at the friction locations by monolithic materials of the described type. In so doing, bearing shells or bearing bushes of one or more pieces are integrated in the structural parts in the region of the tribo-system that are formed of materials which are resistant to high temperatures. When constructed as a roller bearing, at least the inner and outer rings are formed of the materials of the described type.

While the foregoing description and drawings represent the preferred embodiments of the present invention, it will be obvious to those skilled in the art that various changes and modifications may be made therein without departing from the true spirit and scope of the present invention.

What is claimed is:

1. A process for the manufacture of a tribo-system, comprising the steps of:

providing a first structural component part;

providing a second structural component part having a surface layer thereon;

applying by means of chemical vapor deposition, physical vapor deposition or thermal spraying a surface layer to the first structural component part or to an intermediate layer arranged on the first structural component part, said surface layer of said first structural component part being made from a material based on substoichiometric oxides or mixed oxides in monoclinic, triclinic or tetragonal crystal structure formed of $MeO_6$ octahedrons with planar oxygen defects, where Me is a metal; and providing the respective surface layers of said first and second component parts in dry frictional contact with one another.

2. The process for the manufacture of a tribo-system according to claim 1, wherein the first and/or second structural component part is produced by a gradient chemical vapor infiltration process.

3. The process for the manufacture of a tribo-system according to claim 1, further comprising the step of preoxidizing the surface layer of the second structural component part before the first and second structural component parts are provided in dry frictional contact with one another.

4. A process for the manufacture of a tribo-system having first and second structural component parts, said first and second component parts having respective surface layers that are in dry frictional contact with one another, said surface layer of said first structural component part being made from a material based on substoichiometric oxides or mixed oxides in monoclinic, triclinic or tetragonal crystal structure formed of $MeO_6$ octahedrons with planar oxygen defects, where Me is a metal, said method comprising the step of applying the surface layer of the first structural component part by means of chemical vapor deposition, physical vapor deposition or thermal spraying to the first structural component part or to an intermediate layer arranged on the first structural component part.

5. The process for the manufacture of a tribo-system according to claim 4, wherein the first and/or the second structural component part is produced by a gradient chemical vapor infiltration process.

6. The process for the manufacture of a tribo-system according to claim 4, further comprising the step of preoxidizing the surface layer of the second structural component part before the first and second structural component parts are provided in dry frictional contact with one another.

* * * * *